(12) United States Patent
Scheer

(10) Patent No.: US 8,306,699 B2
(45) Date of Patent: Nov. 6, 2012

(54) MANUAL TRACKING ADJUSTMENT

(75) Inventor: Glenn Owen Scheer, Durango, IA (US)

(73) Assignee: Deere & Company, Moline, IL (US)

( * ) Notice: Subject to any disclaimer, the term of this patent is extended or adjusted under 35 U.S.C. 154(b) by 589 days.

(21) Appl. No.: 12/544,896

(22) Filed: Aug. 20, 2009

(65) Prior Publication Data
US 2010/0106373 A1    Apr. 29, 2010

Related U.S. Application Data

(60) Provisional application No. 61/108,328, filed on Oct. 24, 2008.

(51) Int. Cl.
*A01B 69/00* (2006.01)
(52) U.S. Cl. .................................................. 701/41
(58) Field of Classification Search .................... 701/41, 701/50, 51, 53, 54, 69
See application file for complete search history.

(56) References Cited

U.S. PATENT DOCUMENTS

| | | | |
|---|---|---|---|
| 4,175,628 A | 11/1979 | Cornell et al. | |
| 6,523,635 B1 | 2/2003 | Johnston et al. | |
| 6,581,704 B2 | 6/2003 | Law et al. | |
| 7,051,641 B2 | 5/2006 | Berg et al. | |
| 8,108,109 B2 * | 1/2012 | Young et al. | 701/50 |
| 2008/0300759 A1 * | 12/2008 | Young et al. | 701/50 |
| 2011/0224872 A1 * | 9/2011 | Reed | 701/41 |

* cited by examiner

*Primary Examiner* — Faye M. Fleming
(74) *Attorney, Agent, or Firm* — Faegre Baker Daniels LLP

(57) ABSTRACT

A construction vehicle including methods and apparatus for operator directed electronic tracking adjustment.

26 Claims, 3 Drawing Sheets

MANUAL TRACKING ADJUSTMENT

This application claims the benefit of the filing date of U.S. Provisional Patent Application Ser. No. 61/108,328, filed Oct. 24, 2008, entitled "Manual Tracking Adjustment", to Glenn O. Scheer, the disclosure of which is expressly incorporated by reference herein.

FIELD

Background

Movement of construction vehicles, including skid steer loaders, are typically controlled by operator input, movement of operating inputs such as levers or joysticks, controlled either forward and rearward motion of the vehicle. It is sometimes desirable for the vehicle to be driven, propelled, or moved in a straight line. With differences in the vehicle's propulsion system on either side, there is a potential that propelling the vehicle in a straight line is not easily achieved or maintained. For example, if there is a difference in tire diameter between the two sides, the vehicle may not drive in a straight line.

SUMMARY

The present description includes a construction vehicle including a chassis and a first wheel supporting the chassis to drive the chassis over the ground. The construction vehicle also includes an electronic controller independently controlling the first wheel within a first output control range including a first maximum allowable speed and a first minimum allowable speed. The electronic controller is configured to adjust the first output control range. The construction vehicle also includes a first operator input operably coupled to the electronic controller and supported by the chassis. The first operator input is configured to provide a first input to the electronic controller. The construction vehicle also includes an operator interface operably coupled to the electronic controller. The operator interface includes a second operator input. The operator interface also includes a software program configured to show a first tracking adjustment number on the second operator input. The software program is configured to adjust the first tracking adjustment number based on operator tracking adjustment input. The electronic controller receives the first tracking adjustment number. The first tracking adjustment number as at least one factor in determining the first output control range.

The present description also includes a construction vehicle including a chassis and a first wheel supporting the chassis to drive the chassis over the ground. The construction vehicle also includes a transmission supported by the chassis. The transmission provides a first output to the first wheel. The construction vehicle also includes a first operator input for steering the chassis over the ground. The construction vehicle also includes an operator interface displaying a menu of options including tracking adjustment. The construction vehicle also includes an electronic controller coupled to the first operator input and the operator interface. The electronic controller receives a first input from the first operator input. The electronic controller receives the tracking adjustment. The electronic controller controls the first output. The tracking adjustment scales the first input.

The present disclosure also includes a method of electronically adjusting the tracking of a skid steer. The method including the step of providing a skid steer having a chassis and a first wheel supporting the chassis to drive the chassis over the ground. The skid steer also includes an operator interface supported by the chassis. The operator interface includes a program including a first tracking adjustment number. The method also including the step of adjusting the first tracking adjustment number to an adjusted first tracking adjustment number. The method also including the step of scaling a first maximum allowable speed of the first wheel in light of the adjusted first tracking adjustment number.

BRIEF DESCRIPTION OF THE DRAWINGS

The above-mentioned and other features of this invention, and the manner of attaining them, will become more apparent and the invention itself will be better understood by reference to the following description of embodiments of the invention taken in conjunction with the accompanying drawings, wherein.

Figure 1:
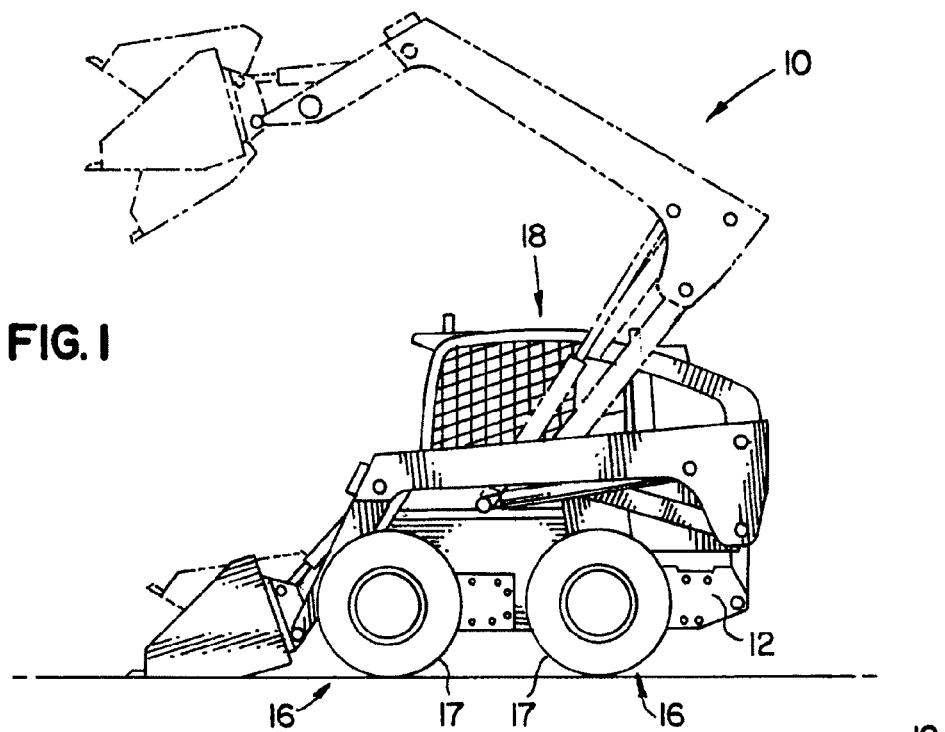
FIG. 1 is a side elevation view of a skid steer showing the skid steer including a chassis, a plurality of wheels or traction devices supporting the chassis on the ground, and an operator cab supported by the chassis.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or limit the invention to the precise forms disclosed in the following detailed description. Rather, the embodiments are chosen and described so that others skilled in the art may utilize their teachings.

In FIG. 1, skid steer 10 is shown for performing several construction functions. The construction functions includes, among other things, steering skid steer 10. Skid steer 10 is configured to set and hold a course along a road, highway lane, or path. Although skid steer 10 is described in FIG. 1, the features described herein may be provided on other vehicles such as bulldozers, front loaders, and other construction vehicles.

Skid steer 10 includes chassis 12, a first plurality of right wheels 14 supporting chassis 12, a second plurality of left wheels 16 supporting chassis 12, and the operator cab 18 supported by chassis 12. The first plurality of wheels 14 include a first plurality of tires 15, also described as first tire 15. Similarly, the second plurality of wheels 16 include a second plurality of tires 17, also described as second tire 17. As discussed in greater detail below, tires 15, 17 can vary in size relative to each other for several reasons, such as uneven wear, differences in shape, or differences in model, such as using a mismatched pair of tires.

Tires 15, 17 propel skid steer 10 along a route. Often, the operator wants skid steer 10 to travel along a straight route. The rotational speed and diameter of tires 15, 17 determine whether skid steer 10 travels along such a straight route. If tires 15, 17 have the same diameter and are rotating at the same speed, skid steer 10 should travel along a straight route. Otherwise, skid steer 10 will most likely not travel along a straight path, unless adjustments are made. To insure that tires 15, 17 are rotating at the same speed, the rotational speed of tires 15, 17 may be calibrated to attempt to propel skid steer 10 along straight line 20, such as a road, highway lane, or path. Rotational speed sensors may be placed on the plurality of wheels 14, 16 to allow electronic controller 28 (FIG. 2) of drive system 22 (FIG. 2) to calibrate the rotational speed of wheels 14, 16 so they turn at the same speed (i.e. the same revolutions per minute). For example, if left wheels 14 are rotating faster than right wheels 16, controller 28 may speed up right wheels 16 to match the speed of right wheels 16, slow down left wheels 14 to match the speed of right wheels 16, or some combination of both so the rotational speeds match.

While the plurality of first wheels 14 and the plurality of second wheels 16 may be calibrated to propel skid steer 10 along straight line 20, tires 15, 17 are not as amenable to calibration as the plurality of first wheels 14 and the plurality of second wheels 16. However, even if the rotational speeds match, skid steer 10 may not travel in along straight line 20 because tires 15, 17 may not be the same size.

Variations in tires 15, 17 may cause different circumferences or perimeter lengths between tire 15, 17 that cause one side of skid steer 10 to travel faster than the other side even though wheels 14, 16 are rotating at the same speed. For example, if right tire 15 has a diameter that is smaller than left tire 17, right tire 15 will provide less travel for the right side of skid steer 10 than tires 17 provides for the left side of skid steer 10. Under this example with the same number of rotations of right and left tires 15, 17, skid steer 10 will veer to the right.

Variations in the tire circumferences over time can be caused by uneven wear rates for tires 15, 17, especially in skid steers 10. Or, one of tires 15, 17 may be replaced with a new tires having a greater, unworn diameter.

Figure 2:
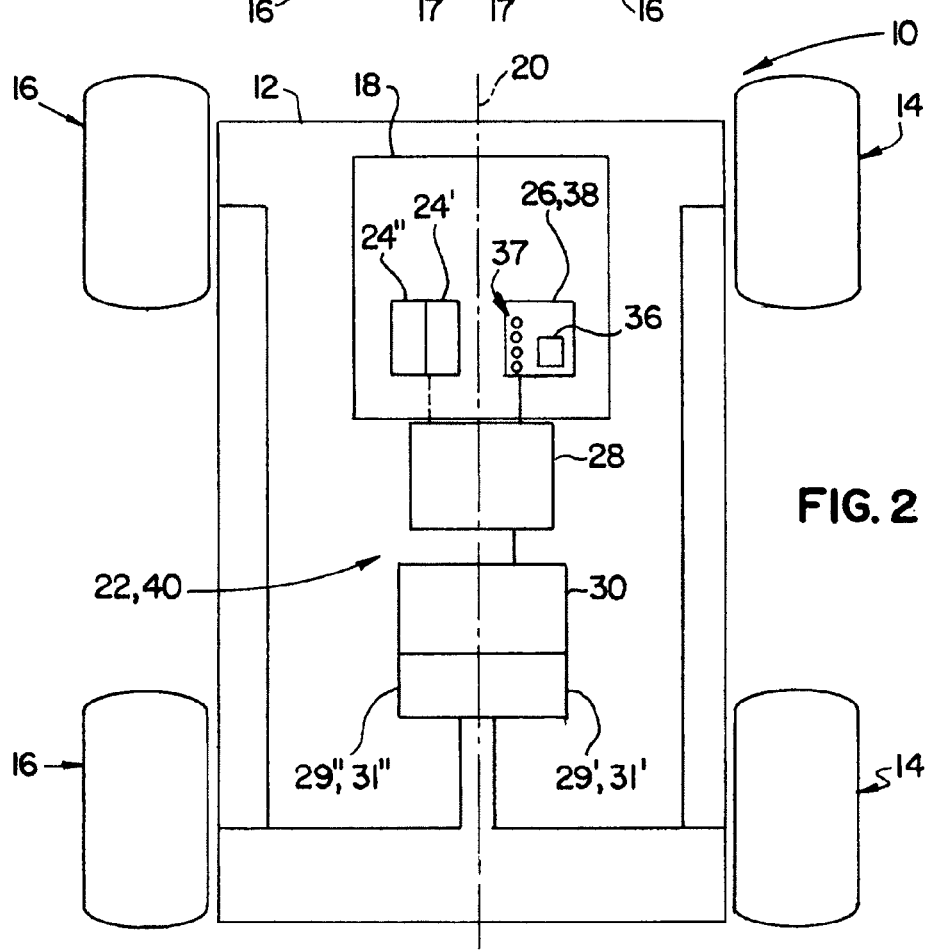
FIG. 2 is a diagrammatic top view of the skid steer of FIG. 1.

As shown in FIG. 2, skid steer 10 includes drive system 22 which, among other things, steers skid steer 10 and calibrates wheels 14, 16 so they rotate at the same speed as discussed above. Drive system 22 includes right and left steering inputs 24', 24" operator interface 26 to receive operational inputs from the operator, electronic controller 28, and hydraulic transmission 30 which provides operating torque to right and left wheels 14, 16. Hydraulic transmission 30 is configured to provide increased displacement, decreased displacement, constant displacement, or no displacement to each of the first plurality of wheels 14 and the second plurality of wheels 16. Steering inputs 24', 24" and operator interface 26 are supported by chassis 12 and are optionally included within operator cab 18.

Steering inputs 24', 24" and operator interface 26 each provide operator instructions to electronic controller 28. Steering inputs 24', 24" are configured to provide steering instructions to electronic controller 28. Steering inputs 24', 24" may include at least one handle, lever, and/or joystick input to steer skid steer 10. In one embodiment, skid steer 10 is controlled by actuation of the pair of steering inputs 24', 24". In this embodiment, each steering input 24', 24" independently controls either forward or rearward motion of one of the first plurality of wheels 14 and one of the second plurality of wheels 16. Moving the pair of steering inputs 24', 24" forward typically produces forward movement of skid steer 10. Similarly, moving the pair of steering inputs 24', 24" backwards produces rearward movement of skid steer 10. According to an alternative embodiment, the function of right and left steering inputs 24', 24" are incorporated into a single joystick. If the joystick is moved straight forward, skid steer 10 should not veer. If it does, the tracking may be adjusted as discussed herein.

As discussed above, an operator often desires to drive skid steer 10 along straight line 20. As previously described, electronic controller 28 is normally configured to calibrate the plurality of wheels 14, 16 to turn at the same speed (i.e. the same revolutions per minute). While electronic controller 28 is configured to calibrate the plurality of wheels 14, 16, typical electronic controllers are not configured to calibrate the rotational speed of tires 15, 17 to compensate for differing tire diameters. To accomplish straight driving with tires 15, 17 of different diameters, the calibration resulting in wheels 14, 16 rotating at the same speed is overridden as discussed herein.

Hydraulic transmission 30 includes right and left pump units 29', 29" and right and left hydraulic motors 31', 31" such as in a dual path hydraulic transmission system 30. Right pump 29' supplies fluid to and receives fluid from left hydraulic motor 31' to rotate the first plurality of wheels 14. Left pump 29" supplies fluid to and receiving fluid from right hydraulic motor 31" to rotate the second plurality of wheels 16.

Electronic controller 28 is operably coupled to and controls hydraulic transmission 30. In response to electronic controller 28, transmission 30 controls left and right pumps 29', 29" and/or left and right hydraulic motors 31', 31" to control the rotational speed of left and right wheels 14, 16. This control may be accomplished in a number of ways, such as operating electro-hydraulic valves.

As discussed above, drive system 22 is configured to steer and also track skid steer 10. For example, an operator may desire to propel, drive, or move skid steer 10 along straight line 20. In this situation, it is typical to match the speeds (i.e. revolutions per minute) of the plurality of wheels 14, 16. It is generally understood that speed sensors placed on the plurality of wheels 14, 16 allow electronic controller 28 to calibrate the plurality of wheels 14, 16 to turn at the same speed, (i.e., the same revolutions per minute for equal inputs from steering inputs 24', 24"). Therefore, speed sensors on the plurality of wheels 14, 16 may be used to calibrate the output of right and left hydraulic motors 31', 31" to each of plurality of wheels 14, 16 so they rotate at the same speed given the same input from steering inputs 24', 24" (or straight forward input from a single joystick or other input). To accomplish this, it may be necessary to operate right and left hydraulic motors 31', 31" at different pressures. However as previously described, difference in tires 15, 17 may cause skid steer 10 to veer from straight line 20 even if wheels 14, 16 are rotating at the same speed.

When wheels 14, 16 are rotating at the same speed, but the tires 15, 17 have different diameter, the operator may notice the tendency of skid steer 10 to veer right or left. In this circumstance, it is beneficial to be able to adjust the output of the right and left hydraulic motors 31', 31" relative to each other to correct for veering.

To correct for veering, skid steer 10 includes tracking adjustment system 40 as part of drive system 22. Tracking adjustment system 40 allows an operator to calibrate drive system 22 to propel skid steer 10 along straight line 20 when desired. For example, if an operator urges left steering control 24" fully forward and right steering control 24" fully forward, they expect that skid steer 10 will travel along a straight line. If it doesn't travel along a straight path (because of different tire diameters or otherwise), the operator may use tracking adjustment system 40 to reduce or eliminate the veering.

As a result, drive system 22 is able to compensate for veering of skid steer 10. Electronic controller 28 of drive system 22 is configured to receive, among other things, tracking instructions input from an operator to an operator interface 26. Operator interface 26 includes inputs, such as a touch screen display 36 and a plurality of pushbuttons 37, and/or user inputs. As described below, the operator uses these inputs to adjust the output of hydraulic motors 31', 31" in response to operator inputs to steering inputs 24', 24" to correct for veering.

According to a preferred embodiment of the present disclosure, tracking adjustment system 40 allows an operator to override the wheel rotational speed calibration. As discussed above, during wheel speed calibration, the rotational speed of wheels 14, 16 is equalized so wheels 14, 16 rotate at the same speed when an operator moves right and left steering inputs 24', 24" as equal amount (ex. fully forward).

Tracking adjustment system 40 includes a manual tracking adjustment number (MTA) that indicates the degree to which the operator overrides the wheel speed calibration. When there is not override, the MTA equals zero (0) and wheels 14, 16 rotate at the same speed (i.e. their calibrated speeds) for equal inputs to steering inputs 24', 24". When the MTA is a value other than zero (0), one set of wheels 14, 16 rotates faster than the other set of wheels 16, 14. Thus, if tires 15, 17 have different diameters, the MTA can be adjusted so that wheels 14, 16 rotate at different speeds, but skid steer 10 travels in a straight line. For example, if right tires 15 have a smaller diameter than left tires 17, skid steer 10 will veer right if right and left tires 15, 17 are rotating at the same speed. To correct this veering, the MTA is adjusted so that right tires 15 rotate faster than left tires 17. The MTA is increased enough to compensate enough for the smaller diameter, but not so much as to overcompensate and cause veering to the left.

As a result of the MTA adjustment, the response of right and left hydraulic motors 31', 31" will be different in response to otherwise equal inputs from steering controls 24', 24". For example, if the MTA adjustment results in the right tires 15 rotating faster than their calibrated speed, equal inputs from right and left steering inputs 24', 24" will result in right tires 15 rotating faster than left tires 17. As a more specific example, if right steering input 24' is fully forward and left steering input is fully forward, right tires 15 will rotate faster than left tires 17. As a result of the MTA adjustment, skid steer 10 will travel in a straighter path, even though the relative rotational speed between tires 15, 17 has increased and tires 15, 17 are different sizes.

Therefore, this adjustment of the MTA results in a scaling of the input to right and left hydraulic motors 31', 31" in response to inputs from right and left steering inputs 24', 24". For example, when the MTA is zero, a range of movement of right steering input 24' (ex. from a neutral position to a fully forward position) results range of speed output from right motor 31' (ex. 0 rpm to 70 rpm). When the MTA is not zero so that right motor 31' moves faster than its calibrated speed to compensate for right veering, the same range of movement of right steering input 24' (from a neutral position to a fully forward position) results in a greater range of speed output from right motor 31' (ex. 0 rpm to 75 rpm). Thus, as a result of the MTA adjustment, the response of right motor 31' to an input from right steering input 24' is scaled up (i.e. the same input from right steering input 24' results in a greater output from right motor 31').

According to one embodiment of the present disclosure, controller 28 implements the adjustment to the MTA. Thus, when the MTA is adjusted, controller 28 increases or decreases the output of right pump 29' in response to an input from right steering input 24' with a resulting increase or decrease in the output speed of right hydraulic motor 31'.

As discussed in greater detail below, an adjustment of the MTA may result in increasing (or decreasing) the speed of either right hydraulic motor 31' or left hydraulic motor 31" from the calibrated speed. Thus, the relative speed of right and left tires 15, 17 may increase or decrease given equal inputs from right and left steering inputs 24', 24".

Figure 3:
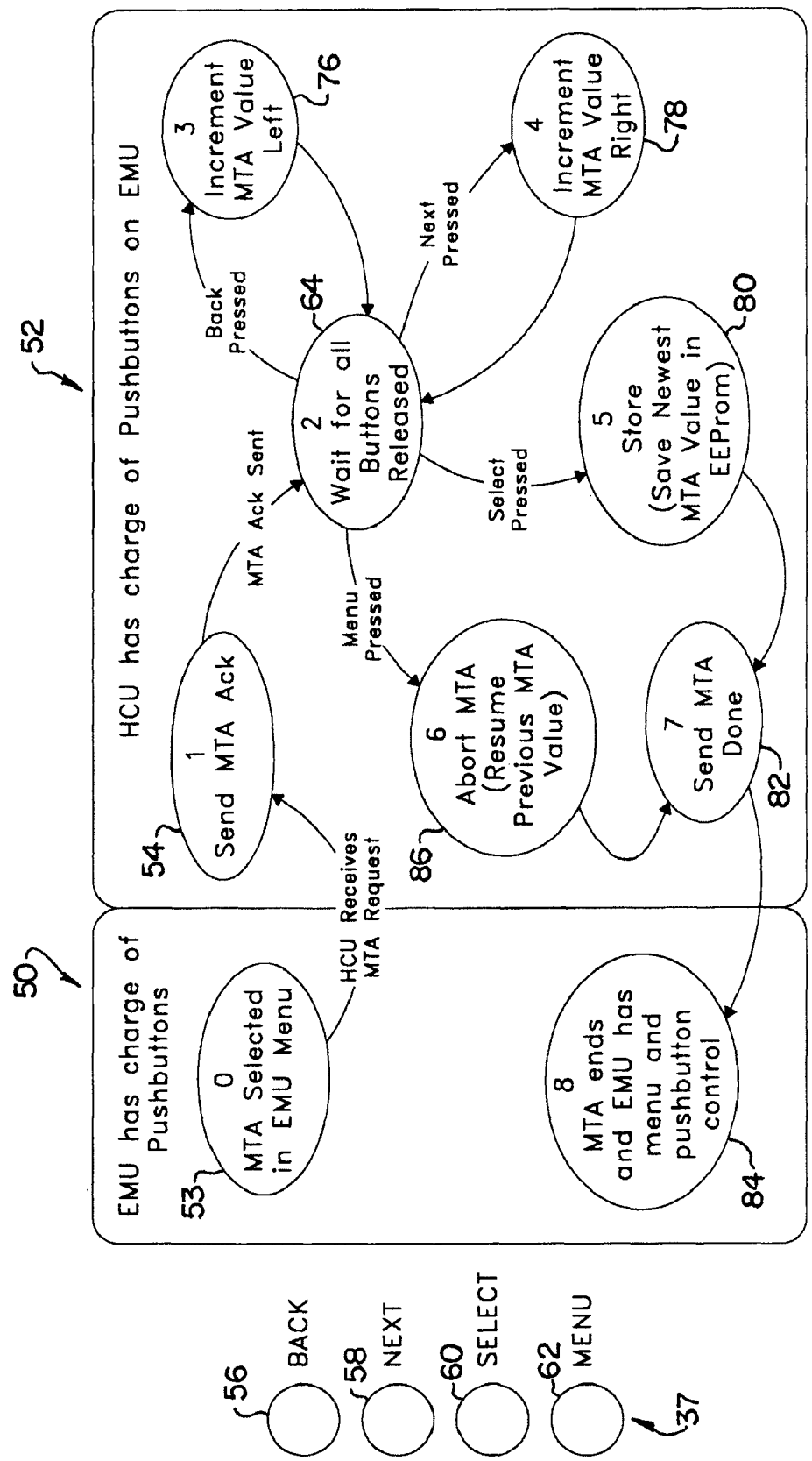
FIG. 3 is a flow diagram showing the adjustment of the tracking of the skid steer.

To assist in adjusting the MTA, tracking adjustment system 40 also includes a software program. As illustrated in FIG. 3, the program provides a menu for selecting MTA adjustment. The menu may include a main menu selection and a MTA adjustment selection shown on display 36. Initially, the menu is controlled by an Engagement Monitoring Unit portion (EMU) 50 of controller 38. If the operator selects the MTA adjustment option from the menu, EMU 50 sends an MTA request to a Hydraulic Control Unit portion (HCU) 52 of controller 38 at step 53. Upon receipt of the MTA request from ECU 50, HCU 52 sends an MTA acknowledgement back to ECU 50 at acknowledgement step 54 and HCU 52 takes over control of display 36. In addition to taking over display 36, HCU 52 become response to plurality of pushbuttons 37 including a back button 56, a next button 58, a select button 60, and a menu button 62. Other labels may be provided for these buttons. Furthermore, ECU 50 is no longer responsive to inputs from these buttons 56, 58, 60, 62. After the acknowledgement, the software waits for all buttons 56, 58, 60, 62 to be released at step 64 and displays an image similar images 66, 68, 70 shown in FIG. 4a, 4b, or 4c. To display the most recent MTA value, the program retrieves the most recent MTA value from memory.

Figure 4A:
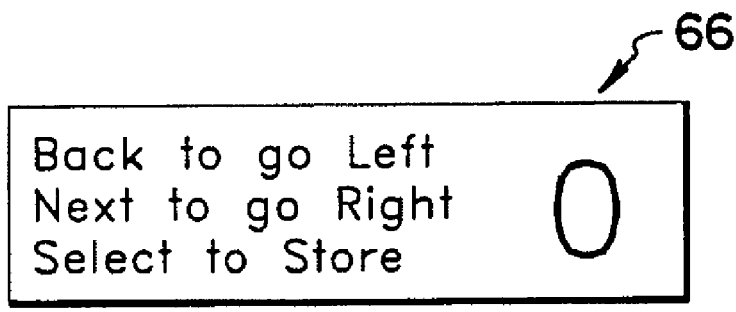
FIG. 4A is a view of an image displaying a neutral bias of the tracking.
Figure 4B:
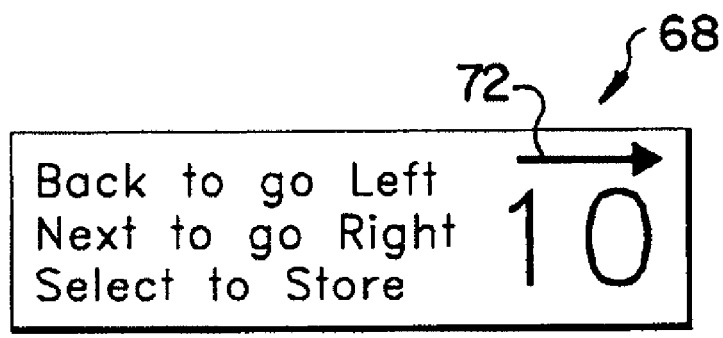
FIG. 4B is a view of an image displaying a right bias.

Images 4a, 4b, 4c give instructions to the operator on how to adjust the MTA. Image 66 is displayed when the MTA is equal to zero and the rotational output speeds of right and left hydraulic motors 31', 31" are set to the calibrated values. As shown in FIG. 4a, image 66 indicates to operator to press back button 56 to go left to correct right veering, to press next button 58 to go right to correct left veering, or to press select button 60 to store the new adjusted MTA.

Figure 4C:
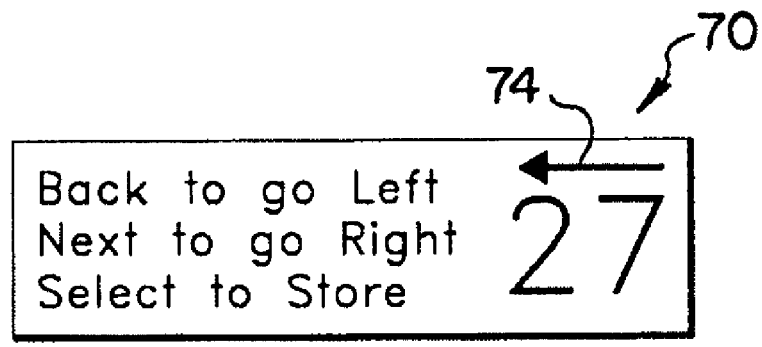
FIG. 4C is a view of an image displaying a left bias greater in magnitude than the right bias of FIG. 4B.

The MTA is adjusted in increments. These increments are shown on display 36 as whole number or integers. The direction of change (or bias) is indicated by a right arrow 72 or a left arrow 74. For example, in FIG. 4b, the operator has adjusted (or biased) the MTA ten (10) increments to the right to adjust for left veering. In FIG. 4c, the operator has adjusted (or biased) the MTA twenty seven (27) increments to the left to adjust for right veering. As shown in step 76 of FIG. 3, the operator has pressed back button 56 which increases the MTA by one increment if the MTA is already left biased (i.e. left arrow 74 is shown and left wheels 14 are rotating faster than right wheels 16). If the MTA is right biased (i.e. right arrow 76 is shown and right wheels 16 are rotating faster than left wheels 16), the MTA decrease by one increment. Right and left arrows 74, 76 will appear and disappear as the MTA goes above zero or back to zero, respectively. The operator may press back button 56 multiple times to increase the left bias or decrease the right bias. In step 78 of FIG. 3, the operator may press next button 58 to increase the right bias or decrease the left bias.

When the operator believes they have the correct amount of bias, they may press select button 60 to store the new MTA value in memory in step 80. Next in step 82, HCU 52 sends a request to ECU 50 to resume control over display 36. When this request is acknowledged by ECU 50 at step 84, ECU 50 takes control of display 36 to display the menu, ECU 50 again becomes responsive to buttons 56, 58, 60, 62 and HCU 52 is again non-response to these buttons 56, 58, 60, 62.

Before HCU 52 transfers control back to ECU 50, the operator may press menu button 62 at step 86 to abort the MTA adjustment. If this occurs, the previous MTA value is not changed, and the software continues to step 82.

Adjustment of the MTA can either reduce or increase the speed of right wheels 14, reduce or increase the speed of left wheels 16, or some combination thereof. According to the preferred embodiment, when the MTA is adjusted to a right bias, the speed of right wheels 16 is greater than the calibrated speed determined by controller 38 and the speed of left wheels 14 remains at the calibrated speed determined by controller 38. Similarly, if the MTA is adjusted to a left bias, the speed of left wheels 14 is greater than the calibrated speed determined by controller 38 and the speed of right wheels 16 remains at the calibrated speed determined by controller 38. If the MTA is zero (i.e. no right or left bias), the speed of right and left wheels remains at the calibrated speed. According to another embodiment, the speed of right and/or left wheels 14, 16 may be dropped below the calibrated speed while the opposite wheels 16, 14 remain at the calibrated speed. According to yet another embodiment, neither of right and left wheels 14, 16 remain at the calibrated speed while the MTA is at a particular value.

According to the preferred embodiment of the present disclosure, the MTA may be adjusted from zero (0) to one hundred (100). It is understood by one of ordinary skill in the art, that the number of units may include other values and the neutral value may be something other than zero (0). It is also understood that more units or less units can be utilized. Furthermore, it is recognized that the units may be positive or negative integers.

In one embodiment, a one hundred (100) unit difference in the MTA is comparable to a tire size of (10%) ten percent difference in tire diameter, such as a ten percent loss caused by wear. Thus, to correct for a 10% smaller right tire 15, the MTA should be adjusted to a left bias of one hundred (100). The resulting adjustment for each increment may be smaller or larger for other embodiments.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A construction vehicle including:
   a chassis,
   a first wheel having a first diameter and a second wheel having a second diameter that differs from the first diameter, the first and second wheels supporting the chassis to drive the chassis over the ground,
   an electronic controller independently controlling the first wheel within a first output control range including a first maximum allowable speed and a first minimum allowable speed, the electronic controller being configured to adjust the first output control range,
   a first operator input operably coupled to the electronic controller and supported by the chassis, the first operator input being configured to provide a first input to the electronic controller, and
   an operator interface operably coupled to the electronic controller, the operator interface including:
      a second operator input, and
      a software program configured to show a first tracking adjustment number on the second operator input, the software program configured to adjust the first tracking adjustment number based on an operator tracking adjustment input that accounts for the different first and second diameters, the electronic controller receiving the first tracking adjustment number, the first tracking adjustment number being at least one factor in determining the first output control range.

2. The construction vehicle of claim 1, wherein the first tracking adjustment number correlates to increasing the first output control range.

3. The construction vehicle of claim 1, wherein the first output control range is a scaling factor applied to the first operator input.

4. The construction vehicle of claim 1, wherein the electronic controller sends a first output control value for controlling the speed of rotation of the first wheel, the first output control value being scaled by the first output control range.

5. The construction vehicle of claim 1, wherein the electronic controller adjusts the first maximum allowable speed.

6. The construction vehicle of claim 1, wherein the first tracking adjustment number correlates to increasing the first maximum allowable speed.

7. The construction vehicle of claim 1, further comprising a second wheel on an opposite side of the chassis from the first wheel, the second wheel supporting the chassis to drive the chassis over the ground, wherein the electronic controller independently controls the second wheel within a second output control range including a second maximum allowable speed and a second minimum allowable speed, the electronic controller adjusting the second output control range.

8. A construction vehicle including:
   a chassis,
   a first wheel supporting the chassis to drive the chassis over the ground,
   a transmission supported by the chassis, the transmission providing a first output to control the speed of rotation of the first wheel,
   a first operator input for steering the chassis over the ground,
   an operator interface displaying a menu of options including a tracking adjustment, and
   an electronic controller coupled to the first operator input and the operator interface, the electronic controller receiving a first input from the first operator input, the electronic controller receiving the tracking adjustment, the electronic controller controlling the first output, the tracking adjustment scaling the first input.

9. The construction vehicle of claim 8, wherein the tracking adjustment is any integer within the range of zero (0) to one hundred (100).

10. The construction vehicle of claim 9, wherein the one hundred (100) integer is calibrated to correct for a ten percent loss of the first tire diameter.

11. The construction vehicle of claim 9, wherein the controller calibrates the rotational speed of a second wheel relative to the first wheel so that the response of the second wheel to a second operator input matches the response of the first wheel to the first input, wherein the tracking adjustment overrides the calibration.

12. The construction vehicle of claim 11, wherein the rotational speed of the first wheel increases relative to its calibrated response and the rotational speed of the second wheel remains at its calibrated response.

13. The construction vehicle of claim 8, wherein the operator interface displays a number representative of the tracking adjustment.

14. The construction vehicle of claim 13, wherein a bias is applied relative to a calibration performed by the electronic controller to have a second wheel rotate at the same speed as the first wheel.

15. The construction vehicle of claim 14, wherein the operator interface displays an indicia indicating a left or right tracking bias.

16. A method of electronically adjusting the tracking of a skid steer, the method including the steps of:
   providing a skid steer having:
      a chassis,
      a first wheel and a second wheel supporting the chassis to drive the chassis over ground, and
      an operator interface supported by the chassis, the operator interface including:
         a program including a first tracking adjustment number,
   calibrating a speed of the first wheel and the second wheel to respond equally to equal inputs,
   adjusting the first tracking adjustment number to an adjusted first tracking adjustment number, the adjusting step overriding the calibrating step, and
   scaling a first maximum allowable speed of the first wheel in response to the adjusting step.

17. The method of claim 16 further comprising the step of scaling a first output control in light of the first maximum allowable speed.

18. The method of claim 16 further comprising the step of scaling the first input in light of the first maximum allowable speed.

19. The method of claim 16 further comprising the step of displaying the first tracking adjustment number on a display of the operator interface.

20. A method of operating a construction vehicle including a chassis, a first wheel having a first diameter, and a second wheel having a second diameter that differs from the first diameter, the first and second wheels supporting the chassis to drive the chassis over the ground, the method including the steps of:
   receiving a steering input from an operator, the steering input commanding movement of the construction vehicle along a straight path;
   receiving a tracking adjustment input; and
   rotating the first and second wheels at different speeds in response to the steering input and the tracking adjustment input, the first and second wheels traveling the same distance during the rotating step to move the construction vehicle along the straight path.

21. The method of claim 20, wherein the first diameter of the first wheel is greater than the second diameter of the second wheel, and wherein the rotating step comprises rotating the second wheel faster than the first wheel.

22. The method of claim 20, further comprising the step of calibrating the first and second wheels to rotate at the same speed, wherein the tracking adjustment input overrides the calibrating step.

23. The method of claim 20, wherein the tracking adjustment input is received from an operator based on an observation of the construction vehicle deviating from the straight path.

24. The method of claim 20, wherein the steering input comprises a first steering input associated with the first wheel and a second steering input associated with the second wheel, the first steering input equaling the second steering input to command movement of the construction vehicle along the straight path.

25. The method of claim 24, wherein the first steering input comprises a first movement of a first joystick and the second steering input comprises a second movement of a second joystick, the first movement equaling the second movement to command movement of the construction vehicle along the straight path.

26. The method of claim 20, wherein the first wheel is on a left side of the construction vehicle and the second wheel is on a right side of the construction vehicle.

* * * * *